Aug. 11, 1942.　　　H. W. RUBINSTEIN　　　2,292,717
SHAFT MOUNTING AND COUPLING
Filed Dec. 13, 1941
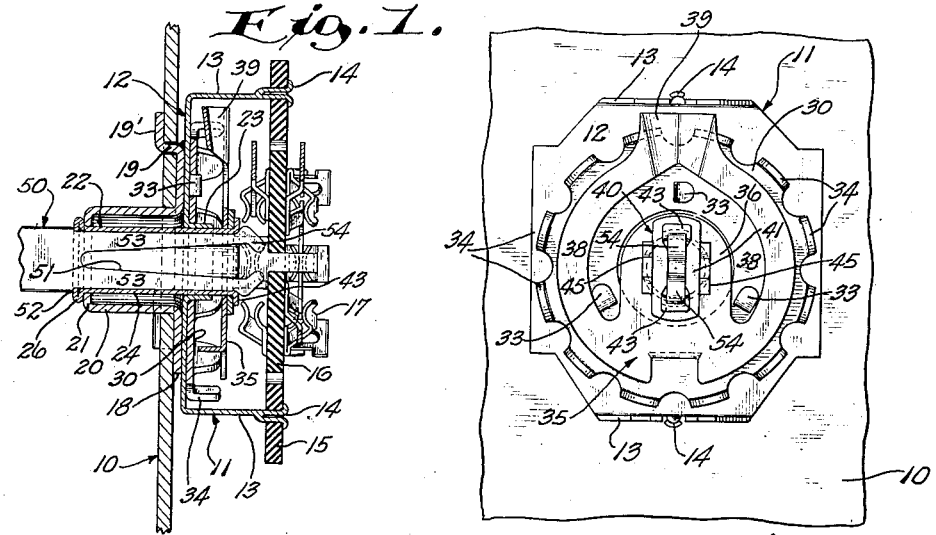
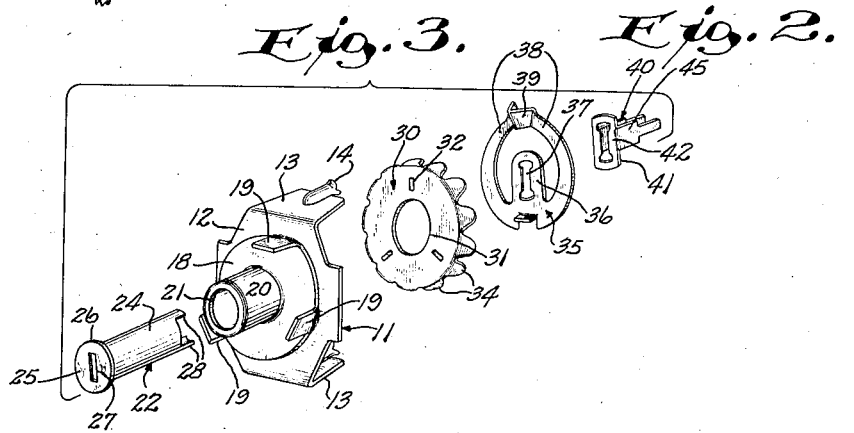
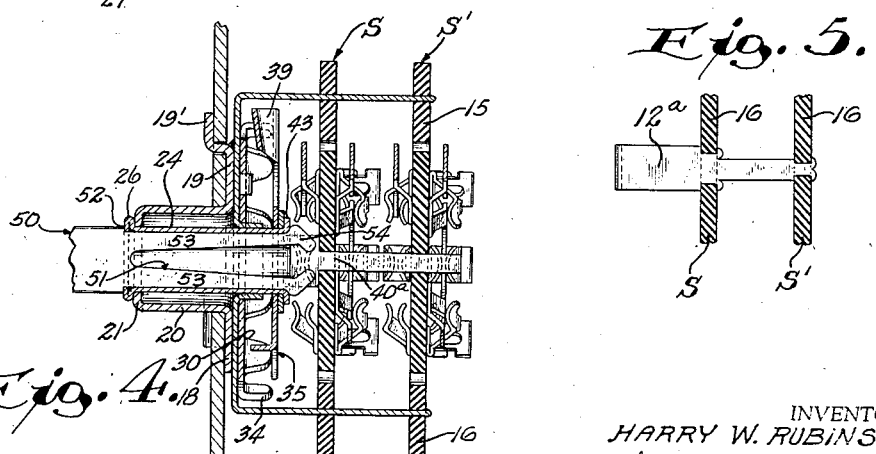
INVENTOR.
HARRY W. RUBINSTEIN.
BY
ATTORNEY.

Patented Aug. 11, 1942

2,292,717

UNITED STATES PATENT OFFICE 2,292,717

SHAFT MOUNTING AND COUPLING

Harry W. Rubinstein, Milwaukee, Wis., assignor to Globe-Union Inc., Milwaukee, Wis., a corporation of Delaware Application December 13, 1941, Serial No. 422,813

6 Claims. (Cl. 64—4)

This invention relates to a combined shaft coupling and bearing especially designed and adapted for use in mounting and operatively connecting control shafts to electric switches of the type having a flat, generally annular, shaped stator of insulating material surrounding a disc-like rotor of similar material, the stator and rotor carrying a plurality of cooperable contact clips or cooperable contact clips and contact segments.

One of the objects of the invention is to provide a combined shaft coupling and bearing wherein the control shaft is readily and easily assembled with and disassembled from its mounting, and at the same time, respectively, coupled with and uncoupled from the switch or switches which it controls, and this in such manner that the switches and the elements thereof are not subject to and are protected from displacement or stress so that the structural integrity of the elements of the switch assemblies, and the proper cooperative relationships between such elements, remain unimpaired even though the control shaft be occasionally applied and removed.

In devices of this kind the housing or frame of the switch is mounted on a fixed support, usually one of the vertical plates of the chassis of the radio receiver or other instrumentality in which the switch is employed. A fixed bearing is provided on the frame or housing of the switch. The present invention proposes to rotatably mount a bearing bushing in the fixed bearing and make provision for preventing axial displacement of the bearing bushing although leaving it free to rotate. The control shaft, which is usually of flat stock, is inserted through the outer end of the bushing and is rotatively coupled thereto, and in the assembly is releasably latched in position although it may be removed by pulling the shaft outwardly. The interconnection of the shaft is, however, with the bushing. A yoke is provided and has its body portion secured to the inner end of the bushing and has its side members integral with and projecting beyond the body portion and interfitted with the rotor switch. If more than one switch unit is employed, the side members of the yoke are elongated so as to be adapted to be suitably connected with the rotors or several switch units.

With a device of this character the fixed bearing and bearing bushing takes the wear and tear incident to the insertion and removal of the control shaft. The yoke transmits the drive to the rotor of the switch and its position in the assembly is not disturbed by the insertion or removal of the shaft. In fact, the yoke aids in maintaining the rotor and the other elements of the switch properly assembled. They are protected not only against displacement but against any stress or strain upon insertion or removal of the shaft.

Another object of the invention is to provide a device of this character wherein the mounting means and switch have had indexing mechanism combined therewith in a simple, practical, and compact manner, and in such manner that the index mechanism performs some function in the mounting of the control shaft.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1 is a view in central, vertical, longitudinal, fragmentary cross section showing the device embodying the present invention, parts being shown in side elevation for the sake of simplicity in illustration;

Figure 2 is a view in elevation looking toward the left-hand side of Figure 1, with the switch removed from the switch frame;

Figure 3 is a group view in perspective showing the bearing bushing, fixed bearing, the switch frame, the fixed index plate, the rotatable index plate, and the yoke prior to assembly;

Figure 4 is a view similar to Figure 1 showing the device applied to a structure employing a plurality of switch units; and Figure 5 is a fragmentary detail view, partly in elevation and partly in section, showing how each side member of the switch frame or housing is stepped to adapt it to be staked to the stators of a plurality of switch units.

Referring to the drawing, and more particularly to Figures 1 to 3, the numeral 10 designates a fixed support. A switch frame or housing, designated generally at 11, is provided, and may be mounted in any suitable way on the fixed support 10. In the construction illustrated, the frame 11 has a body plate 12 and rearwardly directed side members 13. The side members 13 are formed at the rearward ends with split extensions 14 adapted to extend through openings provided in the stator 15 of the switch and to be clinched or staked thereto to rigidly support the stator in position.

This stator 15 is usually in the form of a flat, generally annularly shaped piece of insulating material, such as Bakelite, and surrounds a disc-like rotor 16 of similar material. Cooperable contact clips 17 are carried by the stator and rotor. The details of construction of the switch per se form no part of the present invention as they are well known and widely used in the art. For a fuller disclosure of this element of the invention reference is made to the application of J. S. Coldwell, for "Switches," filed September 20, 1939, Serial No. 295,707, which application is owned by the assignee of this application.

The housing or frame of the switch is not only provided with suitable means to mount it on the fixed support 10, but also is provided with some suitable form of fixed bearing. In the construction illustrated, provision is made in these particulars by welding or otherwise suitably securing a circular plate 18 to the body of the frame or housing of the switch. At angularly spaced points about its periphery the plate 18 has integral attaching lugs 19 designed to be inserted through slits in the support 10 and then clinched or twisted over in securing position, as indicated at 19' in Figure 1. The plate 18 may also have integrally formed therewith a fixed bearing sleeve 20, this sleeve 20 having its outer end formed with an inturned annular flange 21. The inner periphery of this flange 21 provides one of the supports for the rotatable bearing bushing, designated generally at 22. A spaced support of this bearing bushing is provided by forming an opening in the body plate 12 of the switch housing or frame and forming up an annular flange 23 around the margin of this opening. The flanges 21 and 23 are co-axial and the two provide spaced supports for the rotatable bearing sleeve.

Preferably the rotatable bearing bushing 22 is of the cartridge type and comprises a cylindrical body portion 24 provided at one end with an integral end wall 25 united to the body portion of the cartridge by means of a crimp or flange 26. The end wall 25 is provided with a transverse slot 27. At its inner end the body portion 24 of the bearing bushing is formed with inwardly projecting and diametrically opposite integral securing tabs 28. The bearing bushing 22 is assembled in the manner illustrated in Figure 1 so that its body portion is rotatably supported on the inner peripheral surfaces of the flanges 21 and 23, and the crimp or flange 26 at the closed end of the bushing rotatably abuts the outer face of the flange 21 to prevent axial displacement of the bushing 22 in an inward direction. The inner end of the body portion of the bushing and its securing tabs 28 project inwardly beyond the inner end of the bearing flange 23.

A fixed detent plate 30 is provided and has a central opening 31 so that it may be assembled over the flange 23 and disposed flush up against the inner face of the body portion 12 of the switch frame or housing 11. The plate 30 is formed with angularly spaced slots 32 through which lugs 33, struck up from the body portion 12 of the switch frame or housing, project, in the assembly, to hold the fixed detent plate 30 against rotation. The outer peripheral edge of the detent plate is formed with a circumferential series of laterally projecting detent teeth 34 in rounded formation, as illustrated in the drawing. A rotatable spring detent plate, designated as a whole at 35, is provided. The spring detent plate 35 has a hub 36 formed with a slot 37 enlarged at its ends and designed to be fitted over the securing tabs 28 so that the rotatable detent plate 35 is effectively keyed or coupled to the rotatable bearing bushing 22. Curved or arc-shaped spring arms 38 are integral with the hub portion of the spring detent plate 35 and merge into a yieldable wedge-shaped projection or detent proper 39 which is interengaged with the teeth 34 to releasably secure the bushing 22 in any selected adjustment although allowing rotative adjustment thereof, the spring arms 38 yielding and allowing the wedge-shaped detent proper 39 to ride up over the teeth 34 of the fixed detent plate 30 when the bushing 22 is turned.

A yoke, designated generally at 40, is provided, and has a body portion 41, along with slot 42 similar to the slot 37, and like the slot 37 enlarged at its ends to fit over the securing tabs 28, so that the yoke also is fixed or keyed to the bearing bushing. The extreme outer ends of the tab 28 are in the assembly clinched over the outer portions of the body of the yoke, as indicated at 43 in Figure 1, to hold the parts assembled and also to provide keepers or seats, as will hereinafter more clearly appear. Integral with the side edges of the body of the yoke are the side members 45 thereof. The ends of these side members 45 are reduced and are interfitted with slots provided therefor in the rotor 16 so as to establish a driving connection between the bushing and the rotor.

A control shaft, designated generally at 50, is provided. This shaft is preferably of flat stock and is usually equipped at its other end with a knob (not shown). The inner end of the shaft 50 is provided with a longitudinal slot 51 which extends for a considerable portion of the length of the shaft and out through the inner end thereof. The portion of the shaft in which the slot 51 is formed is of reduced width so that shoulders 52 are presented at the juncture of the reduced portion and the main portion of the shaft. Near the end of the shaft through which the slot 51 extends the slot is widened out or flared. With this construction the inner end of the shaft is provided with spring arms 53, and the inner extremities of these spring arms 53 are formed with beveled latching projections 54 designed to have latching engagement with the bent over portions 43 of the tabs 28 to releasably secure the shaft against axial displacement when the shaft is assembled with the bearing bushing 22. The extension of the inner end of the shaft through the correspondingly formed rectangular slot 27 in the end wall 25 of the bushing, the engagement of its spring arm 53 with the inner periphery of the bushing, and the engagement of its latching projections 54 with the flanged-over tabs 28 provide a rigid and secure mounting for the shaft and also rotatively couple or key it to the bushing so that when the shaft is turned the bushing is turned. The shaft, however, may be readily removed by pulling forcefully outwardly thereon. Such action does not, however, disturb the switch unit inasmuch as the stress is applied to the tabs 28 and the bearing bushing 24 and not to the yoke 40 or to the switch.

The form of the invention shown in Figures 4 and 5 is identical with that hereinabove described save that instead of including merely one switch unit two similar switch units, designated at S and S', are provided. They are identical in construction with each other and with the switch unit hereinabove described. In this form of the invention the switch frame or housing has side members designated at 12a (see Figure 5) which are elongated and stepped to adapt them to be interfitted with and staked to the stators 16 of the switch units S and S'. The yoke in this form of invention is designated generally at 40a and it has a body portion 41 identical with the body portion of the yoke 40 and is combined in the same manner with the tabs 28 and bushing 22. The side members 40b of the yoke 40a are elongated so that spaced portions thereof may be interfitted and have driving connection with the several rotors of the several units in the manner indicated in Figure 5.

While I have shown and described several constructions in which the invention may be advantageously embodied, it is to be understood that the constructions shown have been selected merely for the purpose of illustration or example, and that various changes in the size, shape, and arrangement of the parts may be made without departing from the spirit of the invention or the scope of the subjoined claims.

I claim:

1. The combination with the housing of an instrumentality having a rotatable element therein and a fixed bearing sleeve thereon, of a bearing bushing rotatably supported in the fixed bearing sleeve, means for preventing axial displacement of the bearing bushing, a yoke having its body portion secured to the inner end of the bearing bushing and having its side members interconnected with said rotatable element to rotatively couple the bearing bushing thereto, and a control shaft rotatively coupled to the bushing and having a latching projection for releasably securing the shaft against displacement relative to the bushing.

2. The combination with the housing of an instrumentality having a rotatable element therein and a fixed bearing sleeve thereon, of a bearing bushing rotatably supported in the fixed bearing sleeve, means at the outer end of the bearing bushing and engageable with the adjacent end of the fixed bearing for preventing axial displacement of the bearing bushing in an inward direction, a yoke having its body portion secured to the inner end of the bearing bushing and having its side members interconnected with said rotatable element to rotatively couple the bearing bushing thereto, means interposed between the yoke and the housing for preventing axial displacement of the bearing bushing in an outward direction, and a control shaft rotatively coupled to the bushing and having a latching projection biased to latching position for releasably securing the shaft against displacement relative to the bushing.

3. The combination with the housing of an instrumentality having a rotatable element therein and a fixed bearing thereon, of a bearing bushing rotatably supported in said fixed bearing, means for preventing axial movement of the bearing bushing, the inner end of said bearing bushing having integral securing tabs projecting inwardly therefrom, a yoke having a slotted body portion fitted over said tabs, said tabs being clinched over against the body portion of the yoke to secure the yoke and bushing together and also to provide keepers, said yoke having its side members interconnected with said rotatable elements to rotatively couple the bearing bushing thereto, and a control shaft rotatively coupled to the bushing and having latching projections biased to have latching engagement with said keepers for releasably securing the shaft against axial displacement relative to the bushing.

4. The combination with the housing of an instrumentality having a rotatable element therein and a fixed bearing thereon, of a cartridge-type bearing bushing having its body portion rotatively fitted in said bearing and having a closed and flanged end disposed at the outer end of the bushing with the flange rotatively abutting the outer end of the fixed bearing, the closed end of the bushing having a transverse slot, the inner end of the bushing having integral securing tabs projecting inwardly therefrom, a yoke having a slotted body portion fitted over said tabs, said tabs being clinched over against the body portion of the yoke to secure the yoke and bushing together and to provide keepers, said yoke having its side members interconnected with said rotatable element to rotatively couple the bearing bushing thereto, means interposed between the yoke and the bushing for preventing axial displacement of the bushing in an outward direction, and a control shaft having its inner end reduced and of flat stock, said inner end of the shaft being inserted in the bushing through said transverse slot and having latching projections biased to interlatching engagement with said keepers whereby the shaft is rotatatively coupled to the bushing and releasably secured against axial displacement with respect thereto.

5. The combination with a housing of an instrumentality having a rotatable element therein and a fixed bearing thereon, of a bearing bushing rotatably supported in said fixed bearing, means supported at the outer end of the bearing bushing and engageable with the adjacent end of the fixed bearing for preventing axial movement of the bushing in an inward direction, the inner end of said bearing bushing projecting inwardly of the fixed bearing and having integral securing tabs projecting inwardly therefrom, a yoke having a slotted body portion fitted over said tabs, said tabs being clinched over against the body portion of the yoke to secure the yoke and bushing together, said yoke having its side members interconnected with said rotatable element to rotatively couple the bearing bushing thereto, a fixed detent plate having a circumferential series of teeth surrounding the inner end of the fixed bearing and fixedly supported against the housing, a rotatable spring detent plate having a yieldable detent cooperable with said teeth and having its central portion slotted and fitted over said tabs to be rotatively coupled to said bearing bushing, the spring detent plate also coacting with the fixed detent plate and with the tabs to hold the bearing bushing against axial displacement in an outward direction, and a rotatable shaft rotatively coupled to the bushing and having a latching projection biased to latching position for releasably securing the shaft against axial displacement relative to the bushing.

6. The combination with a housing of an instrumentality having a plurality of longitudinally coaxial rotatable elements therein and also having a fixed bearing thereon, of a bearing bushing rotatably supported in said fixed bearing, means for preventing axial movement of the bearing bushing, a yoke having its body portion secured to the inner end of the bearing bushing and having a pair of elongated side members connected at spaced points to said rotatable elements whereby to rotatively couple the bearing bushing and the plurality of rotatable elements, and a control shaft rotatively coupled to the bushing and having a latching projection for releasably securing the shaft against axial displacement relative to the bushing.

HARRY W. RUBINSTEIN.